# United States Patent Office 2,752,356
Patented June 26, 1956

2,752,356

PROCESS OF PREPARATION OF 2-HYDROXY-PYRIDINE-1-OXIDE AND HOMOLOGS

Francis Edward Cislak, Indianapolis, Ind., assignor to Reilly Tar & Chemical Corporation, Indianapolis, Ind., a corporation of Indiana No Drawing. Application July 12, 1954, Serial No. 442,888

4 Claims. (Cl. 260—297)

This invention relates to a new class of chemical compounds and to the process of making them. More particularly it relates to 2-hydroxypyridine-1-oxide and homologs, which compounds may be represented by the following general formula:

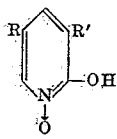

in which R and R' represents hydrogen, an alkyl or aralkyl group.

The 2-hydroxypyridine-1-oxide is a potentially useful bactericidal agent. Antibacterial tests have shown it to be effective against Staph. aureus, B. coli, and Strep. haem. It has not been used extensively because heretofore there has been no commercially feasible method of preparing it.

In 1946 Newbold and Spring [J. Chem. Soc. 1946, 1864–66] have described a way of preparing 2-hydroxypyridine-1-oxide. They reacted 2-bromopyridine with sodium ethoxide to form 2-ethoxypyridine. Then they oxidized the latter compound with hydrogen peroxide to form 2-ethoxypyridine-1-oxide. Hydrolysis with hydrochloric acid gave the desired 2-hydroxypyridine-1-oxide.

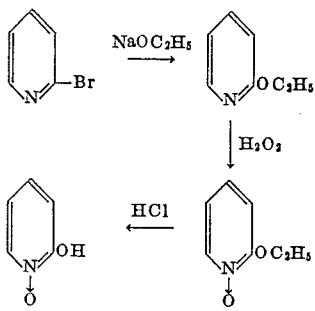

While the Newbold and Spring method is useful as a means of making experimental quantities of 2-hydroxypyridine-1-oxide, it is not suitable for its commercial production. The starting 2-bromopyridine is currently selling at $17.00 per pound. The yield on the first steps, i. e., conversion of the 2-bromopyridine to the 2-ethoxypyridine is only 33%. The oxidation of 2-ethoxypyridine to the 2-ethoxypyridine-1-oxide proceeds with good yield. But the conversion of the 2-ethoxypyridine-1-oxide to 2-hydroxypyridine-1-oxide is only about 50%. In short, about 8 lbs. of 2-bromopyridine (cost $136.00) are required to make 1 lb. of 2-hydroxypyridine-1-oxide. Lott and Shaw [J. Amer. Chem. Soc. 71, 70–73

(1949)] prepared 2-hydroxypyridine-1-oxide by the direct oxidation of 2-pyridone.

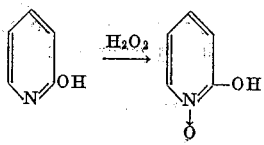

While this procedure is simple the yield is not good, only 15%. Furthermore 2-pyridone is not a commercially available chemical but is usually prepared from 2-bromopyridine.

I have found that I can make 2-hydroxypyridine-1-oxide in good yields by the oxidation of pyridine. Essentially my process comprises oxidizing pyridine with hydrogen peroxide, heating the resultant product with acetic anhydride, and then again oxidizing with hydrogen peroxide.

My process will be readily understood from the detailed examples given below.

Example 1

To a solution of 79 parts of pyridine and about 180 parts of glacial acetic acid, heated to a temperature of about 75° C., is added 200 parts of hydrogen peroxide (30% $H_2O_2$). The hydrogen peroxide is preferably added in small portions during a 4 hour period. The temperature of the solution is maintained at 75° C. during the addition of the hydrogen peroxide. After all of the hydrogen peroxide has been added the solution is maintained at the elevated temperature for an additional 16–20 hours. Then the solution is heated to about 95° C. and about 18 parts of paraformaldehyde is added. The paraformaldehyde is added to destroy any unreacted peroxide. The peroxide free solution is concentrated by distilling off the water and most of the acetic acid. The concentration is carried out under vacuum (30–75 mm. Hg) and is discontinued when no more distillate is obtained and the temperature of the liquid reaches about 95–100° C. The resulting concentrated reaction mixture is added, in small portions, to 600 parts of boiling (refluxing) acetic anhydride. When all of it has been added the resulting acetic anhydride solution is refluxed for about 2 hours more. Then the solution is distilled under reduced pressure, first a foreshot of acetic anhydride is obtained and later a pale yellow oil. The pale yellow oil is dissolved in about 100 parts of glacial acetic acid and then heated to a temperature of about 75° C. To the above solution is added about 150 parts of hydrogen peroxide (30% $H_2O_2$). The hydrogen peroxide is preferably added in small portions during a 3 hour period. The temperature of the solution is maintained at about 75° C. during the addition of the hydrogen peroxide. After all of the hydrogen peroxide has been added the reacting mixture is maintained at the elevated temperature for an additional 16–20 hours. Then the solution is heated to about 95° C. and about 18 parts of paraformaldehyde is added to destroy any unreacted hydrogen peroxide. The peroxide free solution is refluxed for about 6 hours with about 50 to about 100 parts of concentrated hydrochloric acid. The 2-hydroxypyridine-1-oxide is recovered from the peroxide free solution in any suitable manner. One way of recovering the 2-hydroxypyridine-1-oxide is to evaporate the solution under reduced pressure. The 2-hydroxy-pyridine-1-oxide crystallizes from the residue.

Example 2

For reasons of economy I prefer to use pyridine as my starting material. However, I can start with pyridine-1-oxide instead of pyridine. If I start with pyridine-1-oxide I proceed in the following manner.

To 600 parts of boiling acetic anhydride is added, in small portions, 95 parts of pyridine-1-oxide. When the addition is complete, the resulting solution is heated under reflux conditions for about 2 hours more. Then the solution is distilled under reduced pressure, first a foreshot of acetic anhydride is obtained and later a pale yellow oil. This pale yellow oil is processed as in Example 1 and the 2-hydroxypyridine-1-oxide is recovered as in Example 1.

Example 3

The procedure of Example 1 is repeated save that in place of pyridine I use 3-picoline as my starting material. I thus obtain 2-hydroxy-3-picoline-1-oxide.

Example 4

The procedure of Example 1 is repeated save that in place of pyridine I use 3,5 lutidine as my starting material. I thus obtain 2-hydroxy-3,5-lutidine-1-oxide.

For reasons of economy I prefer to use hydrogen peroxide as the oxidizing agent. I can however obtain equally good results by using equivalents of the hydrogen peroxide, such for example as peracetic acid, perbenzoic acid and monperphthalic acids. While in my examples I use a 30% hydrogen peroxide, I can use stronger solutions, such for example as a 50% hydrogen peroxide.

While I prefer to conduct my oxidation reaction at a temperature of about 75° C. I can use either a lower or a higher elevated temperature. I may, for example, do my oxidation at about 40° C., but at this elevated temperature I require a longer time to bring about the desired reaction. Or I can conduct my oxidation reaction at about 90° C.

In place of the acetic anhydride I can use equivalents of it, such as for example propionic acid anhydride.

I claim as my invention:

1. In the preparation of 2-hydroxypyridine-1-oxides having the general formula:

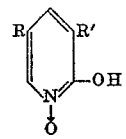

in which R and R' represent hydrogen, a lower alkyl, and a benzyl group, the steps which comprise heating with acetic anhydride at a temperature substantially corresponding to the boiling point of acetic anhydride, a pyridine-1-oxide which has hydrogen attached to pyridine ring carbon at the 2-position, the 4-position and the 6-position, oxidizing at a temperature of about 40° C. to about 90° C. the resulting reaction product with hydrogen peroxide, and recovering the 2-hydroxypyridine-1-oxide.

2. In the preparation of 2-hydroxypyridine-1-oxide the steps which comprise heating pyridine-1-oxide with acetic anhydride at a temperature substantially corresponding to the boiling point of acetic anhydride, oxidizing at a temperature of about 75° C. the resulting reaction product with hydrogen peroxide, and recovering the 2-hydroxypyridine-1-oxide.

3. In the preparation of 2-hydroxy-3-picoline-1-oxide, the steps which comprise heating 3-picoline-1-oxide with acetic anhydride at a temperature substantially corresponding to the boiling point of acetic anhydride, oxidizing at a temperature of about 75° C. the resulting reaction product with hydrogen peroxide, and recovering 2-hydroxy-3-picoline-1-oxide.

4. The process of preparing 2-hydroxypyridine-1-oxide which comprises the following steps: (1) Reacting at about 75° C. a mixture comprising acetic acid, pyridine, and hydrogen peroxide; (2) Concentrating by heating at a temperature substantially corresponding to the boiling point of acetic anhydride under reduced pressure; (3) Heating the resultant concentrated reaction mixture with acetic anhydride; (4) Distilling off unreacted acetic anhydride to recover the reaction product; (5) Reacting said reaction product at a temperature of about 75° C. with a mixture comprising acetic acid and hydrogen peroxide; (6) Recovering the 2-hydroxypyridine-1-oxide.

References Cited in the file of this patent

UNITED STATES PATENTS

| | | |
|---|---|---|
| 2,540,218 | Shaw | Feb. 6, 1951 |
| 2,663,711 | Bullitt | Dec. 22, 1953 |

OTHER REFERENCES

Newbold et al.: Chem. Abst., vol. 43, col. 2997 (1949).
Lott et al.: J. Am. Chem. Soc., vol. 71, pp. 70–73 (1949).